(12) United States Patent
Lagares-Greenblatt (10) Patent No.: US 11,093,953 B2
(45) Date of Patent: Aug. 17, 2021

(54) CUSTOMER PROFILING THAT ACCOUNTS FOR EARLY PRODUCT PROGRAMS

(71) Applicant: International Business Machines Corporation, Armonk, NY (US)

(72) Inventor: Heidi Lagares-Greenblatt, Jefferson Hills, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

(21) Appl. No.: 15/860,807

(22) Filed: Jan. 3, 2018

(65) Prior Publication Data
US 2019/0205902 A1 Jul. 4, 2019

(51) Int. Cl.
*G06Q 30/02* (2012.01)
*G06Q 30/00* (2012.01)

(52) U.S. Cl.
CPC ....... *G06Q 30/0201* (2013.01); *G06Q 30/016* (2013.01)

(58) Field of Classification Search
None
See application file for complete search history.

(56) References Cited

U.S. PATENT DOCUMENTS

| 7,860,898 B1 * | 12/2010 | Moranta ............... G06F 16/958 707/803 |
| 9,372,685 B1 | 6/2016 | Luettge et al. |
| 2008/0313008 A1 | 12/2008 | Lee et al. |

OTHER PUBLICATIONS

Dunk, Alan S., "Product Life Cycle Cost Analysis: The Impact of Customer Profiling, Competitive Advantage, and Quality of Is Information," Management Accounting Research 15, No. 4, 2004, pp. 401-414.
Xu, Mark, et al., "Gaining Customer Knowledge Through Analytical Crm," Industrial Management & Data Systems 105, No. 7, 2005, pp. 955-971.

* cited by examiner

*Primary Examiner* — Cory W Eskridge
(74) *Attorney, Agent, or Firm* — Cantor Colburn LLP; Teddi Maranzano (57) ABSTRACT

Aspects include identifying a customer that received a product as part of an early product program. A document that describes the early product program is accessed. Variables of the early product program are extracted based at least in part on content of the document. Customer profile rules are created based at least in part on the extracted variables. The customer profile rules are applied to a customer profile of the customer. The applying includes identifying issues in the customer profile of the customer that relate to the early product program. The customer profile of the customer is updated based at least in part on the applying. The updating includes flagging the identified issues as being related to the early product program.

20 Claims, 4 Drawing Sheets

CUSTOMER PROFILING THAT ACCOUNTS FOR EARLY PRODUCT PROGRAMS

BACKGROUND

Embodiments of the present invention relate in general to customer profiling, and more specifically to customer profiling that accounts for early product programs.

Special agreement programs between a product manufacturer and a set of selected customers are often used in industries which require customer testing of products. Early product programs can be in place for customers who are willing to use a product before it becomes generally available to the public. An example of an early product program is a beta program for computer software. Beta software typically is software that is considered complete but still not ready for general use due to its lack of testing at customer locations. Beta software is often distributed to selected customers to install for use at customer locations so that they can test and provide feedback about the product. Special agreement programs can also be in place during new feature deployment where, for example, selected customers are installing a patch or new feature before it is available to other customers.

SUMMARY

Embodiments of the present invention include methods, systems, and computer program products for customer profiling that accounts for early product programs. A non-limiting example method includes identifying a customer that received a product as part of an early product program and accessing a document that describes the early product program. Variables of the early product program are extracted based at least in part on content of the document. Customer profile rules are created based at least in part on the extracted variables. The customer profile rules are applied to a customer profile of the customer. The applying includes identifying issues in the customer profile of the customer that relate to the early product program. The customer profile of the customer is updated based at least in part on the applying. The updating includes flagging the identified issues as being related to the early product program.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

In accordance with one or more embodiments of the present invention, customer profiling that takes into account impacts caused by early product programs is provided. As used herein the terms "early product program" and "special agreement program" are used interchangeably to refer to a program where a customer, or client, receives a product (or an update to a product) prior to the product (or the update to the product) being generally available. In the computer industry, early product programs can be in place for hardware, software, firmware, or a combination of two or more of hardware, software and firmware. Examples of early product programs include, but are not limited to beta test programs, early support programs, early ship programs, and early adopter programs. Early product programs can create a big variation in the history, transactions, workloads, and culture of a customer. The variation can be so great that a special agreement program can impact the customer profiling performed on the customer and can even cause an incorrect profile of the customer due to the culture of early programs where feedback about a product as well as an increased number of issues are expected. One or more embodiments of the present invention can be utilized to recognize the different characteristics of special product program scenarios when compared to typical business as usual (BAU) scenarios where a customer obtains a product after it is generally available to the public.

Examples are described herein that relate to the computer industry where the products include computer hardware, software, and firmware. Products can also include new feature deployment of enhancements to existing products as well as fixes, or patches, to existing products to correct defects. Embodiments are not limited to computer products, as embodiments can be utilized by any industry which requires product testing with a set of customers. Embodiments can be utilized for products such as, but not limited to computer products, retail store strategies, marketing programs, and material science programs.

The term "customer" is used herein to refer to a recipient of a product either during an early product program or in a BAU manner. Aa used herein, the term "variable" refers to elements of an early product program that are defined, for example, in contractual agreements that describe the early product program such as, but not limited to: general availability date, announcement date, installation date, and warranty data.

As used herein, the term "customer profile" refers to information about a customer such as, but not limited to: name, contact person(s), business industry, country, system class, customer satisfaction level, likely date of next sale of particular products, and warranty expiration dates. Contents of the customer profile can be derived or sourced from customer systems data which includes information about current products of the customer, and from customer history data that includes purchase dates and issues related to or reported by the customer. For example, the customer satisfaction in the customer profile can be derived based on the number of issues within a selected period of time that are contained in the customer history data. The customer profile can be used by a vendor for marketing and product support purposes. The customer profile can further be used for estimating sales predictions and for recruiting customers for future early product programs.

In accordance with one or more embodiments of the present invention, the impact(s) of early product programs are analyzed and taken into account in customer profiles so that customer profiles are not incorrectly skewed by the customer participating in an early product program. Early product program variables that can affect a customer profile are determined, and customer profiles for customers participating in early product programs are created or modified based on the identified variables so that they reflect a more accurate view of the customer.

One or more embodiments of the present invention can be used to determine and define variables related to early product programs and to create a model that is applied for customer profiling. Pre-general availability (GA) variables are examined and it is determined whether they have an impact on the customer profiling. There can be certain early product program scenarios that can have a significant impact on typical customer profiling. One or more embodiments of the present invention can be used to make customer profiling more accurate by creating a system to determine variables for customer product programs dynamically and then by creating a correlation model to predict the impact of some of the special scenarios encountered during early product programs on customer profiling. The system can analyze issues reported by the customer and search for events or actions that overlap those issues to see if there are any correlations that affected those issues based on an early product program agreement. The system can determine those variables and adjust the customer profile accordingly.

In general, relations and expectations of customers participating in early product programs, where they are using a product prior to the product being generally available, can be very different from a customer that is receiving a product in a BAU manner (e.g., after GA of the product). Some of the issues described, for example, in problem management reports (PMRs), in the early product program timeframe may be quite different from the typical customer issues after the product is generally available. In early product programs, customers may expect some issues such as, but not limited to disruptions, lower performance, and restrictions. In accordance with one or more embodiments of the present invention described herein, customer profiles are adjusted to flag, remove, or lessen the impact of these expected issues.

The relationship between workloads, transactions, issues, and culture for pre-GA systems and post-GA systems can greatly differ depending on the customer and the program scenario. As used herein, the term "culture" refers to customer expectations. The terms of a special agreement often set customer expectations differently than the terms of an agreement that accompanies a BAU purchase of a product. For example, a customer participating in an early product program may expect a longer amount of elapsed time to fix issues and/or a larger number of issues to be encountered when compared to a product that is GA. Thus, customers that participate in early product programs often have a more relaxed culture than BAU customers.

One or more embodiments of the present invention can be used to determine the characteristics of what makes a system GA (e.g., available to the public in a BAU manner) versus pre-GA to determine the variables related to the early product program, and to use these characteristics to create a more accurate customer profile. Determining the characteristics, or variables, can be performed based, for example, on legal agreements relating to the early product program, and/or weekly logs of events occurring during the early product programs (e.g., stored in a customer history file). The system can also identify anomalies in the pre-GA system that can affect the view of the overall customer profile. As long as the system can understand the variables that constitute the contractual agreements and the culture of the early product programs, the system can make a determination of whether these variables have an accurate effect on customer profiling.

There are contemporary systems that perform customer profiling. However, they do not take into account the impact of products that are received prior to GA. The nature and variables for early product programs can vary greatly depending on the program, the contractual agreement(s), and validation data between the company selling the product and their customers. One of more embodiments of the present invention described herein can identify these variables which will later be used to analyze the customer scenarios to determine if there are any predicative patterns that will impact the customer profiling.

Figure 1:
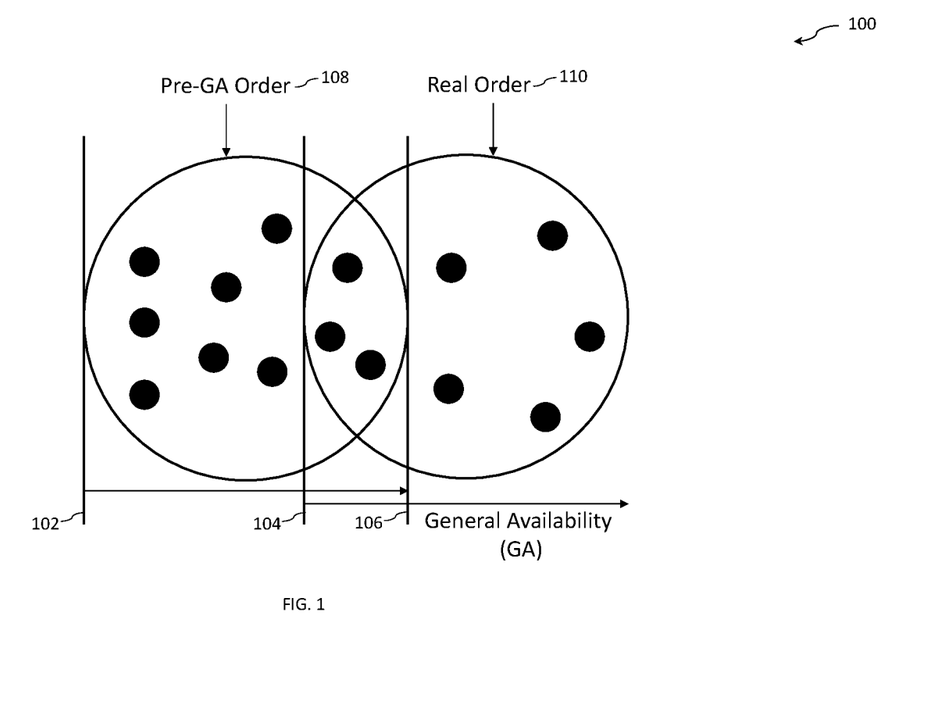
FIG. 1 depicts a block diagram of issues identified in a customer profile of a customer who has participated in an early product program in accordance with one or more embodiments of the present invention.

Turning now to FIG. 1, a block diagram 100 that depicts issues identified in a customer profile of a customer who has participated in an early product program is generally shown in accordance with one or more embodiments of the present invention. In the example shown in FIG. 1, "customer x" participated in an early support program starting at time 102 for computer hardware that included "machine type 2965z13 hardware." The contract for the special agreement program allowed for the company providing the product to ship the hardware to "customer x" two months ahead of GA 104. However, the agreement also allowed this customer to continue the use of the hardware sixty days post GA 106 and then to return to their usual BAU process after sixty days. The sixty days post GA is a key variable in this example because these machines are many times not at the mandatory ship levels (MSLs) (e.g., software is not at specified version levels) so the issues and history related to this particular machine may not reflect an accurate picture of what the customer is facing during the typical work. Many customers accept the terms and conditions for early product programs with the understanding that they may have more issues than usual along the way (depending on the program and agreements). One or more embodiments of the present invention can be utilized to understand the variable in this scenario and when doing customer profiling, if there is any specific situation during those sixty days, it can understand that the customer may not be under typical circumstances. Sixty days is an example of a time frame and any other time frame can be specified by a special agreement program.

For example, as shown in FIG. 1, pre-GA order data set 108 includes data points (e.g., issues) that fall after GA 104 that should be analyzed to determine if any of them have an impact on customer profiling caused by being in the early support program. The effect of these data points can be flagged or eliminated from the real-order data set 110. The example in FIG. 1 is a single customer and a single early product program. The analysis can become much more complicated when a customer is involved in multiple overlapping early product programs. One or more embodiments of the present invention can be utilized to analyze impacts of multiple early product programs on a single customer profile.

The variables in the example shown in FIG. 1 can be sourced from the contract and/or one or more repositories. The variables can include, but are not limited to: early support program entry, early support program install, announcement data, GA data, early support program exit date, early support program exit criteria, hardware/firmware/software mandatory ship levels (MSLs), and problem management report (e.g., issue) history for this time period.

One or more embodiments of the present invention can programmatically extract, from a contract or other document describing the early support program, that a key variable is "60 days post GA". Any issues (i.e., problem management reports) with the product post sixty days after GA can fall under special situation and will not be considered BAU for customer profiling.

Figure 2:
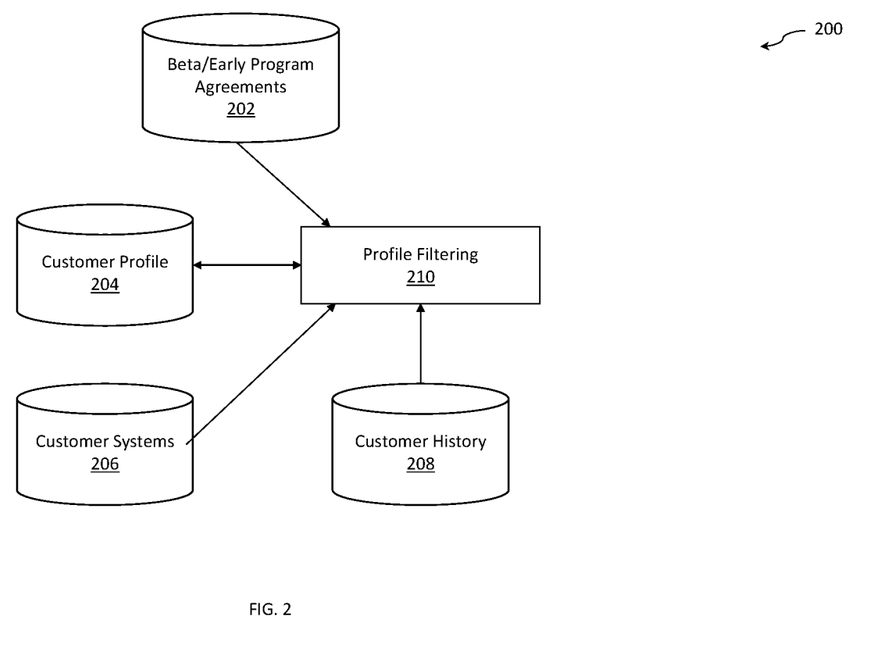
FIG. 2 depicts a block diagram of a computer system for customer profiling that accounts for early product programs in accordance with one or more embodiments of the present invention.

Turning now to FIG. 2, a block diagram 200 of a computer system for customer profiling that takes into account impacts of early product programs is generally shown in accordance with one or more embodiments of the present invention. The computer system shown in FIG. 2 includes profile filtering logic 210 for performing the processing described herein. It also includes a beta/early program agreements repository 202, a customer profile repository 204, a customer systems repository 206, and a customer history repository 208 which are input to the profile filtering logic 210 for performing the processing described herein.

In accordance with one or more embodiments of the present invention, the profile filtering logic 210 determines the characteristics of what makes a system GA (e.g., for a BAU process) after the customer has participated in an early product program for the product. For example, a computer processor may need to have hardware, software, and firmware at a specified MSL level. In addition, depending on the contents of the contract for the early product program, characteristics can include specific dates such as, but not limited product announcement data and/or GA date. In addition, a code that indicates installation of a GA product can also be used to differentiate the state of that product.

The customer profile repository can include data such as, but not limited to current customer name, business name, industry, country, and customer satisfaction. The customer systems repository 206 can include data such as, but not limited to current systems installed at the customer location(s), hardware/software/firmware versions of the systems, and competitor systems installed at the customer location(s). The customer history repository 208 can include historical data such as, but not limited to workload history, purchase history, and issues history. The beta/early program agreements repository 202 can include the special agreements that describe the terms of the early product programs The special agreements can include data such as, but not limited to descriptions of a time window for upgrades; windows for extra capacity, extra memory, and extra processors; specific dates for workloads; upgrades; and warranties.

The profile filtering logic 210 can create a set of variables based at least in part on the definition and contractual agreements in the beta/early program agreements repository 202. For example: the profile filtering logic 210 can create variables for the GA date, the announcement date, installation date, MSLs, reconciliation date, warranty data, and exit date from the early product program. In accordance with one or more embodiments of the present invention, the variables are extracted by a smart, or question answering computer system, such as Watson™ from IBM. The question and answering computer system can be used to perform syntax analysis to extract data when there is a special agreement between two parties to read and understand the terms of the contract. In this manner, a smart system can generate flags, or variables to be used for determining impacts of the special agreement program on a client profile.

The profile filtering logic 210 can use the set of variables to create a dynamic correlation model of the above data along with the beta/early program variables for a specific customer. The output of this model can include customer profile rules that are used to determine if there are any predictive patterns, trends, outliers, classifications that can be used to adjust customer profiles of those customers that are participating for the beta/early programs. In this manner, differences between pre-GA products and BAU products are identified and accounted for in customer profiling so that a customer profile shows an accurate profile of the customer.

The components shown in FIG. 2 can be located in one or more different geographic locations and connected via one or more networks. For example, portions of the profile filtering logic 210 can be executed on one or more different processors in one or more different locations. In addition, the beta/early program agreements repository 202, customer profile repository 204, customer systems repository 206, and customer history repository 208 can be physically stored in one or more storage devices in one or more geographic locations.

Figure 3:
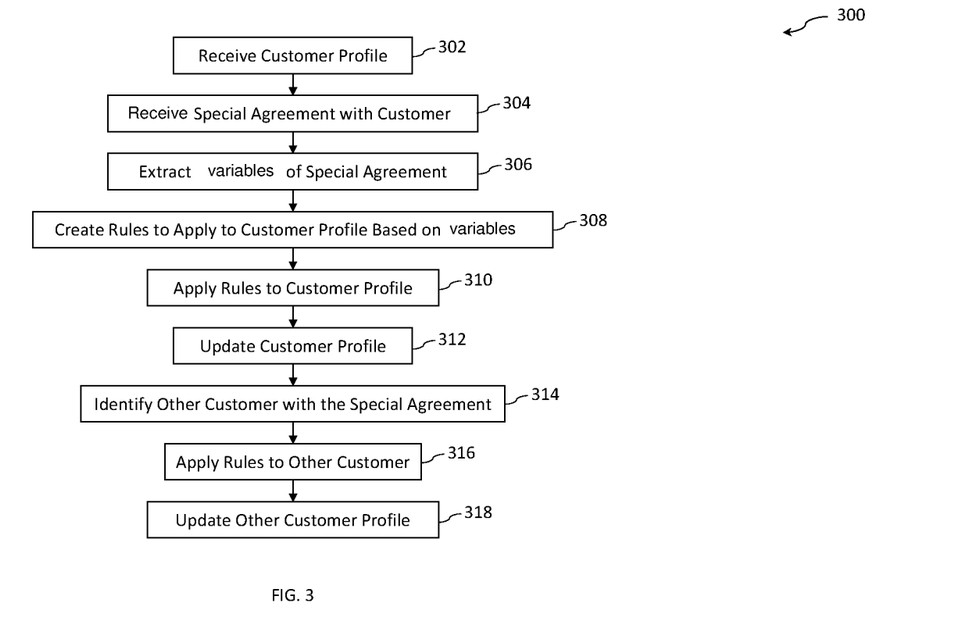
FIG. 3 depicts a flow diagram for customer profiling that accounts for early product programs in accordance with one or more embodiments of the present invention.

Turning now to FIG. 3, a flow diagram 300 for customer profiling that takes into account impacts of early product programs is generally shown in accordance with one or more embodiments of the present invention. The processing shown in FIG. 3 can be performed by computer instructions executed by a processor implementing the profile filtering logic 210 shown in FIG. 2.

At block 302, a customer profile for a customer is received, or accessed, for example, from the customer profile repository 204. The customer profile can also include data from the customer systems repository 206 and the customer history repository 208. At block 304, a special agreement that describes an early product program that the customer is participating in is received, and at block 306 variables of the early product program are extracted from the special agreement. The special agreement can be stored, for example, in the beta/early program agreements repository 202. In accordance with one or more embodiments the variables are extracted using text analytics software or question answering software as described above.

At block 308, rules are created based at least in part on the extracted variables. In accordance with one or more embodiments, a dynamic correlation model is generated based on the extracted variables. The output of the model includes customer profile rules that are applied to the customer profile at block 310 and the customer profile is updated at block 312. Examples of rules include, but are not limited to: flag (or remove) issues related to a particular product under a special agreement program between specified dates; and flag (or remove) issues between specified dates of products that interface with a particular product under a special agreement program.

The profiles are used to determine if there are any predictive patterns, trends, outliers, classifications that should be adjusted in customer profiles of those customers that are participating in an early product program. In some special agreement programs, the agreements may vary between customers while in other special agreement programs all customers may have the same terms in their contracts. When the agreements between customers vary the set of variables extracted by the smart engine will vary. One or more embodiments of the present invention can be used to determine when the data is causing a biased or unbiased customer profile and can then create a correlation model to adjust the skewing based on a special agreement program(s) in place with the customer.

At block 314, other customers that are participating in the same early product program with the same terms are identified. At block 316, the rules generated at block 310 are applied to the other customers and at block 318 their customer profiles are updated. In this manner, blocks 304, 306, and 306 only need to be performed once for each unique early product program agreement.

Figure 4:
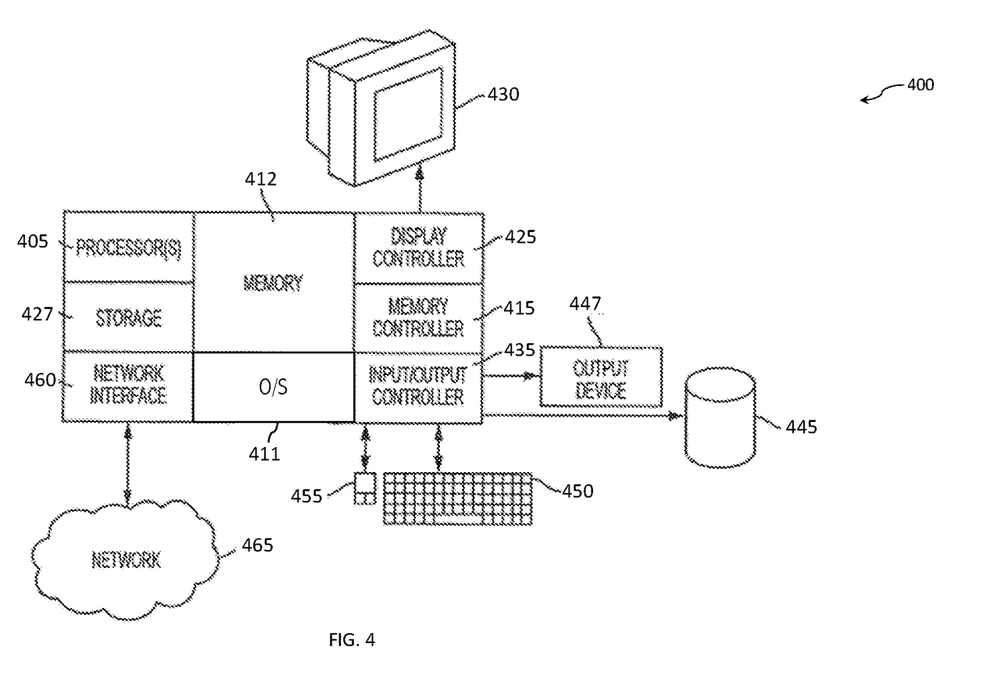
FIG. 4 depicts a block diagram of a computer system for implementing some or all aspects of customer profiling that accounts for early product programs in accordance with one or more embodiments of the present invention.

Turning now to FIG. 4, a block diagram of a computer system 400 for implementing some or all aspects of customer profiling that takes into account impacts of early product programs is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a mobile device, personal computer, workstation, minicomputer, or mainframe computer.

In an exemplary embodiment, as shown in FIG. 4, the computer system 400 includes a processor 405, memory 412 coupled to a memory controller 415, and one or more input devices 445 and/or output devices 447, such as peripherals, that are communicatively coupled via a local I/O controller 435. These devices 447 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 447, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 412. The processor 405 may be a custom made or commercially available processor, a central processing unit (CPU), an auxiliary processor among several processors associated with the computer system 400, a semiconductor based microprocessor (in the form of a microchip or chip set), a microprocessor, or other device for executing instructions. The processor 405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 412 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 412 may incorporate electronic, magnetic, optical, or other types of storage media. Note that the memory 412 may have a distributed architecture, where various components are situated remote from one another but may be accessed by the processor 405.

The instructions in memory 412 may include one or more separate programs, each of which comprises an ordered listing of executable instructions for implementing logical functions. In the example of FIG. 4, the instructions in the memory 412 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 427, which may be a storage device such as a hard disk drive or solid state drive. The stored instructions in memory 412 or in storage 427 may include those enabling the processor to execute one or more aspects of the dispatch systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for customer profiling that takes into account impacts of early product programs as described herein can be embodied, in whole or in part, in computer program products or in computer systems 400, such as that illustrated in FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    executing, by a processor, a derivation process to derive a first customer profile for a customer based on customer history data of the customer, the customer history data comprising workload history data, purchase history data, and issues history data;
    storing, by the processor, the first customer profile as the customer profile for the customer;
    identifying, by the processor, that the customer received a product as part of an early product program; and
    based on the identifying:
        accessing, by the processor, a document that describes the early product program;
        extracting, by the processor, variables of the early product program based at least in part on content of the document, the extracting comprising performing text analytics on the content of the document;
        creating, by the processor, customer profile rules based at least in part on the extracted variables;
        modifying, by the processor the derivation process to derive an updated customer profile for the customer that takes into account any impacts to the first customer profile caused by the early product program, the modified derivation process based on the customer history of the customer and on the created customer profile rules; and
        executing, by the processor, the modified derivation process to derive an updated customer profile, the executing the modified derivation process comprising:
            executing the derivation process to derive the first customer profile;
            applying the customer profile rules to the first customer profile, the applying comprising identifying issues in the first customer profile that relate to the customer participating in the early product program, at least one of the identified issues related to a product other than the product received as part of the early product program;
            updating the first customer profile based at least in part on the applying, the updating comprising flagging the identified issues as being related to the early product program; and
            storing the updated first customer profile as the customer profile for the customer.

2. The method of claim 1, further comprising:
    identifying an other customer that received a product as part of the early product program;
    applying the customer profile rules to a customer profile of the other customer, the applying comprising identifying issues in the customer profile of the other customer relating to the early product program; and
    updating the customer profile of the other customer based at least in part on the applying the customer profile rules to a customer profile of the other customer, the updating the customer profile of the other customer comprising flagging the identified issues as being related to the early product program.

3. The method of claim 1, wherein the early product program is selected from the group consisting of a beta test program, an early support program, an early ship program, and an early adopter program.

4. The method of claim 1, wherein the variables include a date range of the early product program.

5. The method of claim 1, wherein input to the applying includes the issues history data.

6. The method of claim 1, wherein the creating customer profile rules includes creating a correlation model based at least in part on the extracted variables.

7. The method of claim 1, wherein the updating further comprises removing the identified issues from the updated first customer profile.

13

8. A system comprising:
a memory having computer readable instructions; and
one or more processors for executing the computer readable instructions, the computer readable instructions controlling the one or more processors to perform operations comprising:
  executing a derivation process to derive a first customer profile for a customer based on customer history data of the customer, the customer history data comprising workload history data, purchase history data, and issues history data;
  storing the first customer profile as the customer profile for the customer;
  identifying that the customer received a product as part of an early product program;
  based on the identifying:
    accessing a document that describes the early product program;
    extracting variables of the early product program based at least in part on content of the document, the extracting comprising performing text analytics on the content of the document;
    creating customer profile rules based at least in part on the extracted variables;
    modifying the derivation process to derive an updated customer profile for the customer that takes into account any impacts to the first customer profile caused by the early product program, the modified derivation process based on the customer history of the customer and on the created customer profile rules;
    executing the modified derivation process to derive an updated customer profile, the executing the modified derivation process comprising:
      executing the derivation process to derive the first customer profile;
      applying the customer profile rules to the customer profile, the applying comprising identifying issues in the first customer profile that relate to the customer participating in the early product program, at least one of the identified issues related to a product other than the product received as part of the early product program;
      updating the customer profile of the customer based at least in part on the applying, the updating comprising flagging the identified issues as being related to the early product program; and
      storing the updated first customer profile as the customer profile for the customer.

9. The system of claim 8, wherein the operations further comprise:
  identifying an other customer that received a product as part of the early product program;
  applying the customer profile rules to a customer profile of the other customer, the applying comprising identifying issues in the customer profile of the other customer relating to the early product program; and
  updating the customer profile of the other customer based at least in part on the applying the customer profile rules to a customer profile of the other customer, the updating the customer profile of the other customer comprising flagging the identified issues as being related to the early product program.

10. The system of claim 8, wherein the early product program is selected from the group consisting of a beta test program, an early support program, an early ship program, and an early adopter program.

14

11. The system of claim 8, wherein the variables include a date range of the early product program.

12. The system of claim 8, wherein input to the applying includes the issues history data.

13. The system of claim 8, wherein the creating customer profile rules includes creating a correlation model based at least in part on the extracted variables.

14. The system of claim 8, wherein the updating further comprises removing the identified issues from the updated first customer profile.

15. A computer program product comprising a computer readable storage medium having program instructions embodied therewith, the program instructions executable by a processor to cause the processor to perform operations comprising:
  executing a derivation process to derive a first customer profile for a customer based on customer history data of the customer, the customer history data comprising workload history data, purchase history data, and issues history data;
  storing the first customer profile as the customer profile for the customer;
  identifying that the customer received a product as part of an early product program; and
  based on the identifying:
    accessing a document that describes the early product program;
    extracting variables of the early product program based at least in part on content of the document, the extracting comprising performing text analytics on the content of the document;
    creating customer profile rules based at least in part on the extracted variables;
    modifying the derivation process to derive an updated customer profile for the customer that takes into account any impacts to the first customer profile caused by the early product program, the modified derivation process based on the customer history of the customer and on the created customer profile rules;
    executing the modified derivation process to derive an updated customer profile, the executing the modified derivation process comprising:
      executing the derivation process to derive the first customer profile;
      applying the customer profile rules to the customer profile, the applying comprising identifying issues in the first customer profile that relate to the customer participating in the early product program, at least one of the identified issues related to a product other than the product received as part of the early product program;
      updating the customer profile of the customer based at least in part on the applying, the updating comprising flagging the identified issues as being related to the early product program; and
      storing the updated first customer profile as the customer profile for the customer.

16. The computer program product of claim 15, wherein the operations further comprise:
  identifying an other customer that received a product as part of the early product program;
  applying the customer profile rules to a customer profile of the other customer, the applying comprising identifying issues in the customer profile of the other customer relating to the early product program; and updating the customer profile of the other customer based at least in part on the applying the customer profile rules to a customer profile of the other customer, the updating the customer profile of the other customer comprising flagging the identified issues as being related to the early product program.

17. The computer program product of claim 15, wherein the early product program is selected from the group consisting of a beta test program, an early support program, an early ship program, and an early adopter program.

18. The computer program product of claim 15, wherein the variables include a date range of the early product program.

19. The computer program product of claim 15, wherein input to the applying includes the issues history data.

20. The computer program product of claim 15, wherein the creating customer profile rules includes creating a correlation model based at least in part on the extracted variables.

\* \* \* \* \*